(12) United States Patent
Takahashi et al.

(10) Patent No.: US 12,515,334 B2
(45) Date of Patent: Jan. 6, 2026

(54) TASK TEACHING METHOD AND TASK TEACHING SYSTEM

(71) Applicant: Hitachi High-Tech Corporation, Tokyo (JP)

(72) Inventors: Hiroki Takahashi, Tokyo (JP); Masahiro Koyama, Tokyo (JP); Tomohiro Inoue, Tokyo (JP); Takashi Saegusa, Tokyo (JP); Shinichi Ishikawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 101 days.

(21) Appl. No.: 18/291,339

(22) PCT Filed: Sep. 27, 2021

(86) PCT No.: PCT/JP2021/035348
§ 371 (c)(1),
(2) Date: Jan. 23, 2024

(87) PCT Pub. No.: WO2023/047574
PCT Pub. Date: Mar. 30, 2023

(65) Prior Publication Data
US 2025/0001599 A1    Jan. 2, 2025

(51) Int. Cl.
*B25J 9/16*    (2006.01)

(52) U.S. Cl.
CPC .......... *B25J 9/1664* (2013.01); *B25J 9/1653* (2013.01); *B25J 9/1697* (2013.01)

(58) Field of Classification Search
CPC ...... B25J 9/1664; B25J 9/1653; B25J 9/1697; G05B 2219/36442; G05B 2219/40116; G05B 19/42; G05B 2219/40391
See application file for complete search history.

(56) References Cited

U.S. PATENT DOCUMENTS

| 2009/0132088 A1 | 5/2009 | Taitler |
| 2016/0239013 A1* | 8/2016 | Troy ............ B25J 9/1664 |

(Continued)

FOREIGN PATENT DOCUMENTS

| DE | 10 2019 109 624 A1 | 10/2019 |
| EP | 3 733 355 A1 | 11/2020 |

(Continued)

OTHER PUBLICATIONS

International Search Report (PCT/ISA/210) issued in PCT Application No. PCT/JP2021/035348 dated Dec. 7, 2021 with English translation (5 pages).

(Continued)

*Primary Examiner* — Sihar A Karwan
(74) *Attorney, Agent, or Firm* — Crowell & Moring LLP

(57) ABSTRACT

Provided is a task teaching method for teaching a task to a robot that includes a gripper unit configured to grip a grip target object and moves the grip target object gripped by the gripper unit, the task teaching method including: a generation step (S701) of outputting, as a reference path, time-series data regarding a position and an attitude of the grip target object when a teacher grips and moves the grip target object and generating teaching data of the robot corresponding to the reference path; and a modification step (S702) of outputting, as an operation path, time-series data regarding a position and an attitude of the grip target object or the gripper unit when the robot is operated using the teaching data before an actual task is executed by the robot and modifying the teaching data such that the operation path matches with the reference path.

14 Claims, 15 Drawing Sheets

(56) References Cited

U.S. PATENT DOCUMENTS

| | | | |
|---|---|---|---|
| 2018/0046152 A1* | 2/2018 | Fujita | G05B 19/402 |
| 2019/0105779 A1* | 4/2019 | Einav | B25J 9/1689 |
| 2019/0291277 A1* | 9/2019 | Oleynik | B25J 9/1669 |
| 2019/0321983 A1 | 10/2019 | Chen et al. | |
| 2021/0387301 A1* | 12/2021 | O'Hare | B25J 9/1697 |
| 2022/0024037 A1* | 1/2022 | Lee | B25J 13/08 |

FOREIGN PATENT DOCUMENTS

| | | |
|---|---|---|
| JP | 6-250730 A | 9/1994 |
| JP | 6-324732 A | 11/1994 |
| JP | 2011-62793 A | 3/2011 |
| JP | 2015-54378 A | 3/2015 |
| JP | 2015-71206 A | 4/2015 |
| JP | 2017-217738 A | 12/2017 |
| JP | 2018-51652 A | 4/2018 |
| JP | 2019-119027 A | 7/2019 |
| WO | WO 2015/153739 A1 | 10/2015 |

OTHER PUBLICATIONS

Japanese-language Written Opinion (PCT/ISA/237) issued in PCT Application No. PCT/JP2021/035348 dated Dec. 7, 2021 with English translation (7 pages).

Japanese-language International Preliminary Report on Patentability (PCT/IPEA/416 & PCT/IPEA/409) issued in PCT Application No. PCT/JP2021/035348 dated May 17, 2022, including Annexes with partial English translation (24 pages).

German-language Office Action issued in German Application No. 11 2021 007 731.7 dated Jun. 13, 2025 with partial English translation (7 pages).

* cited by examiner

[FIG. 1]
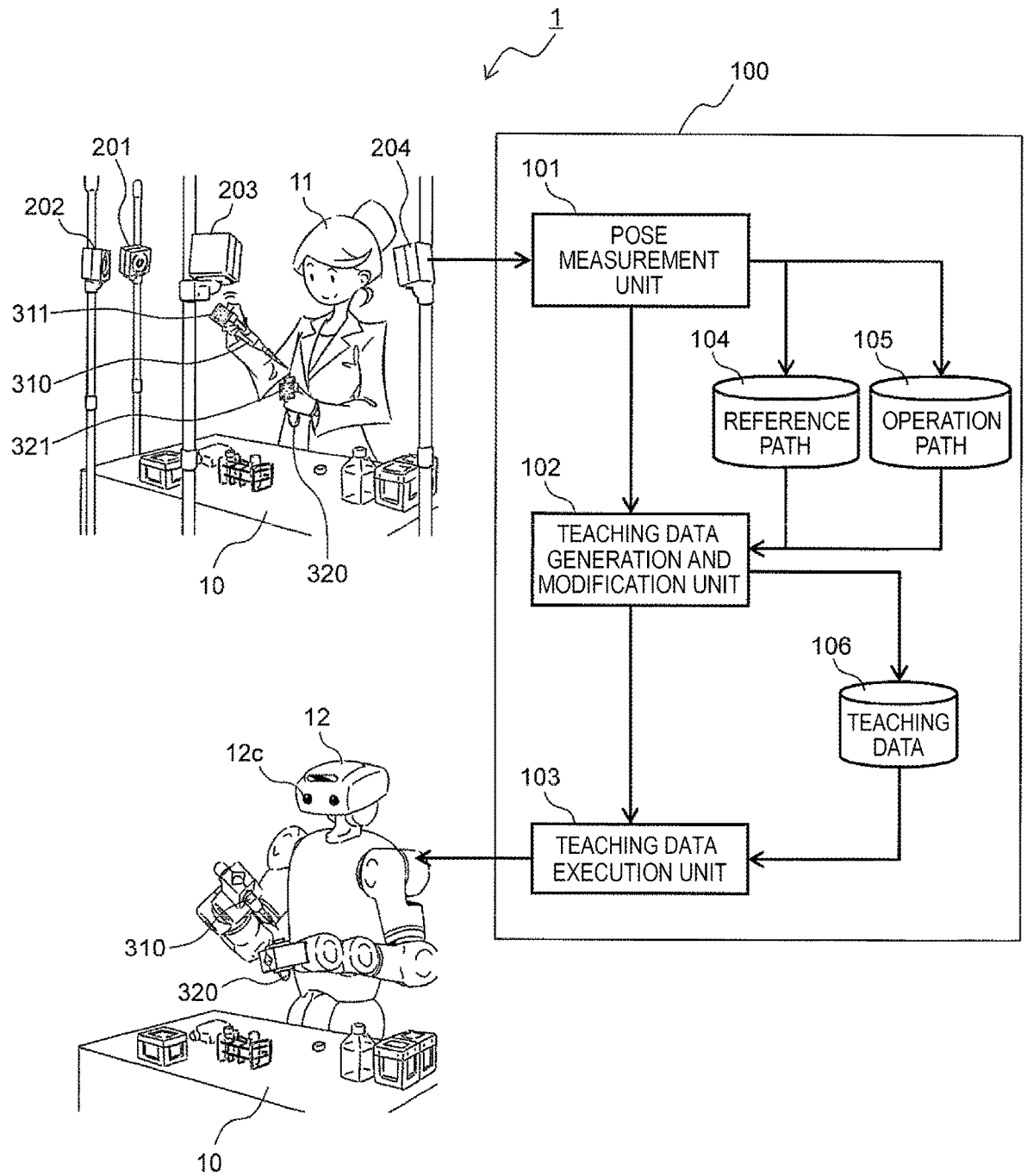

[FIG. 2]
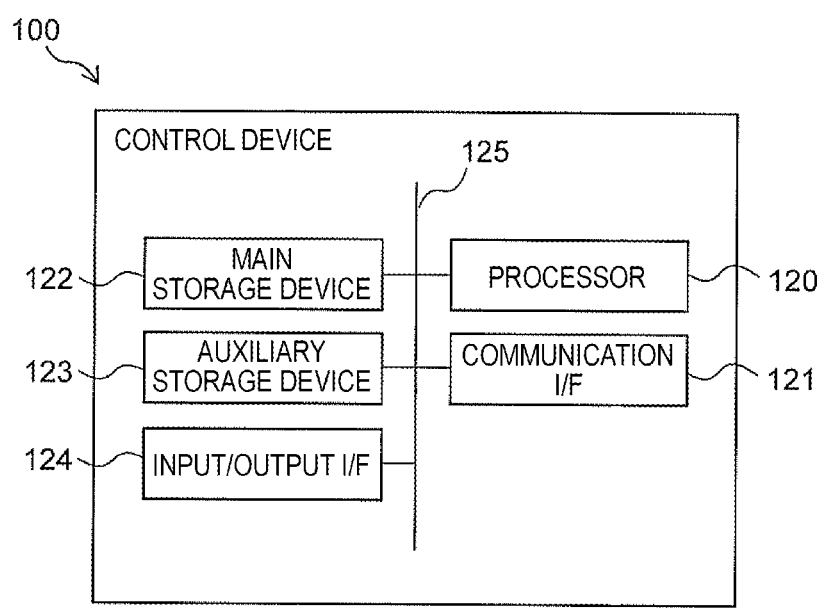

[FIG. 3]
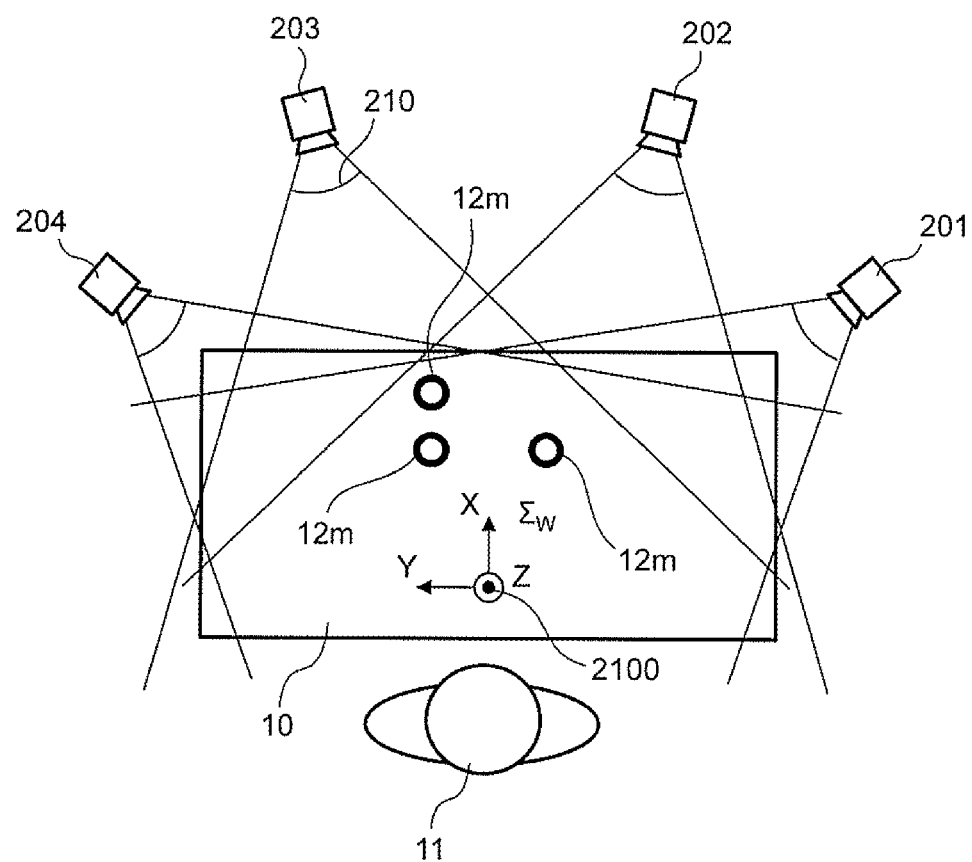

[FIG. 7]
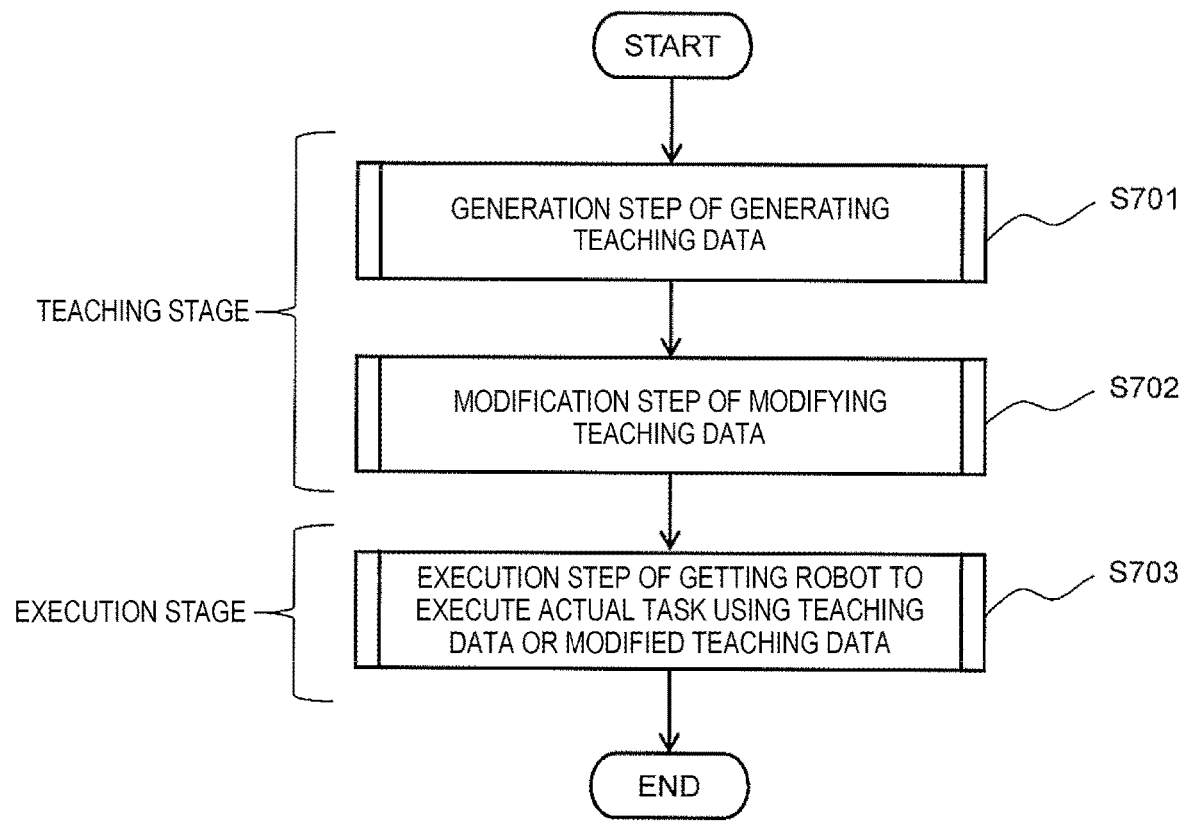

[FIG. 8]
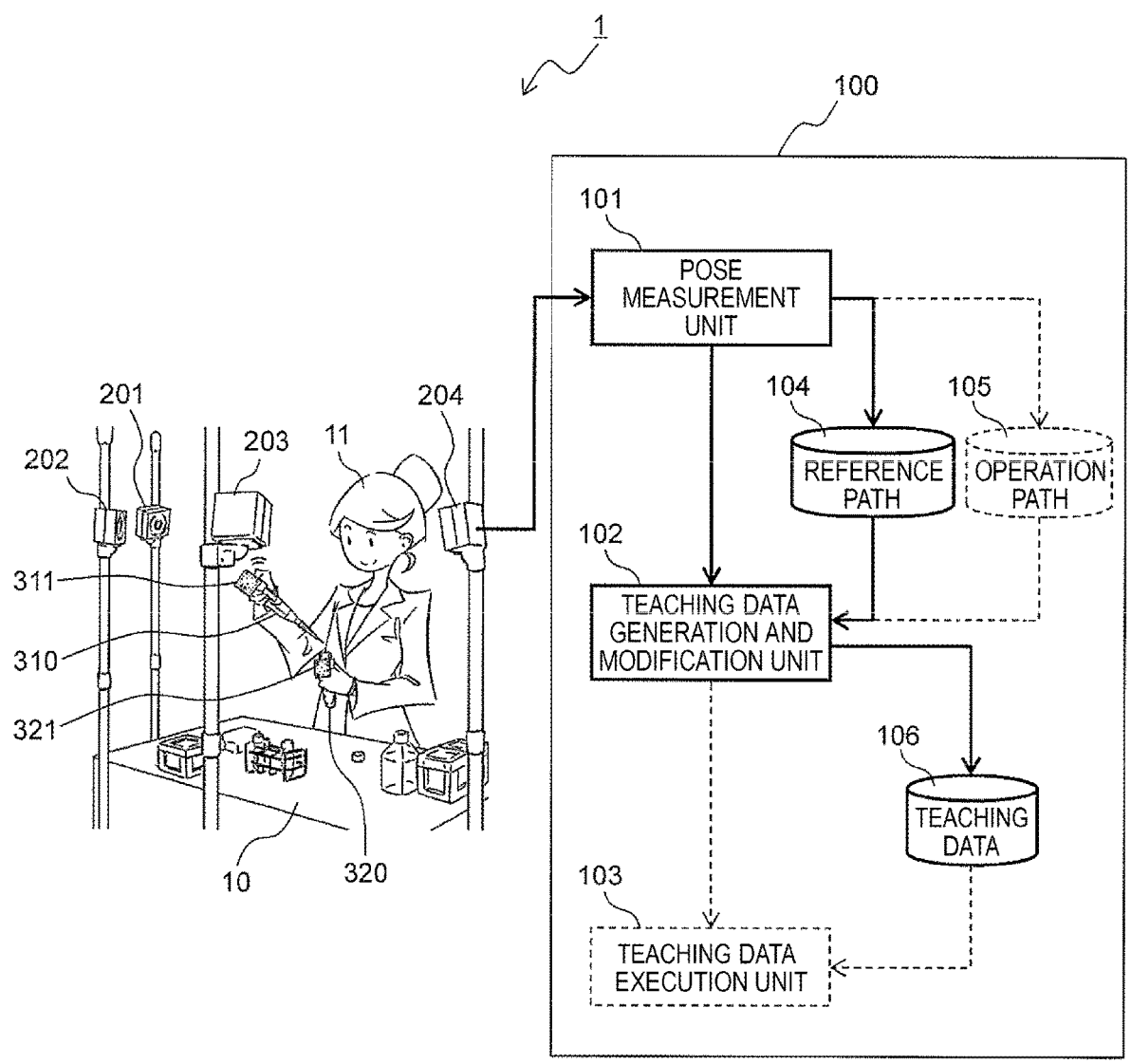

[FIG. 9]
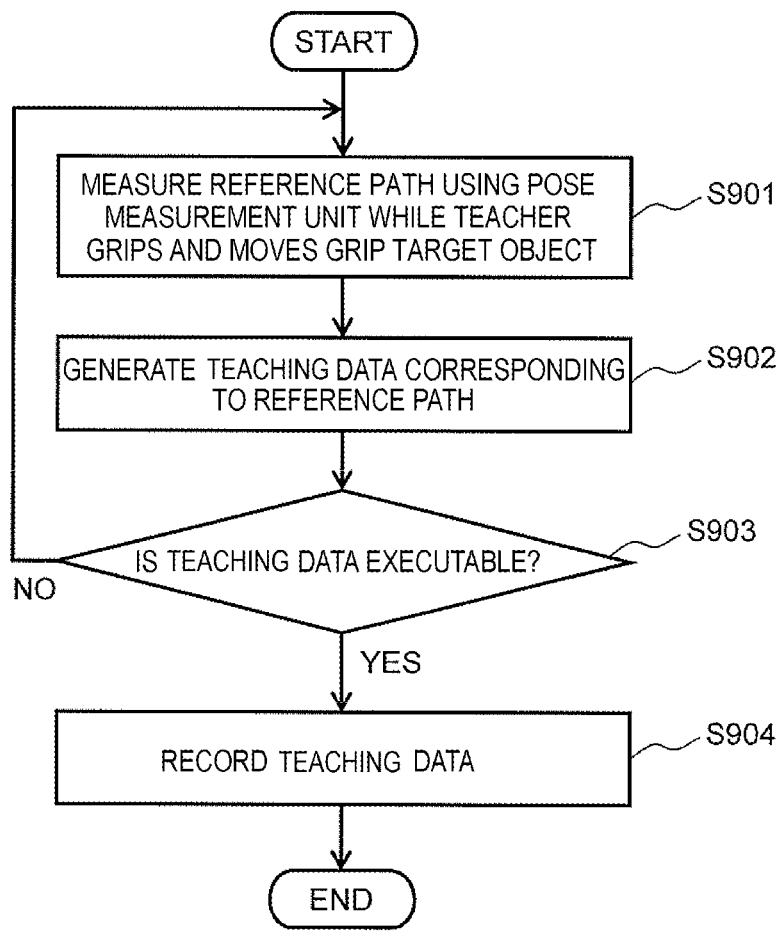

[FIG. 10]
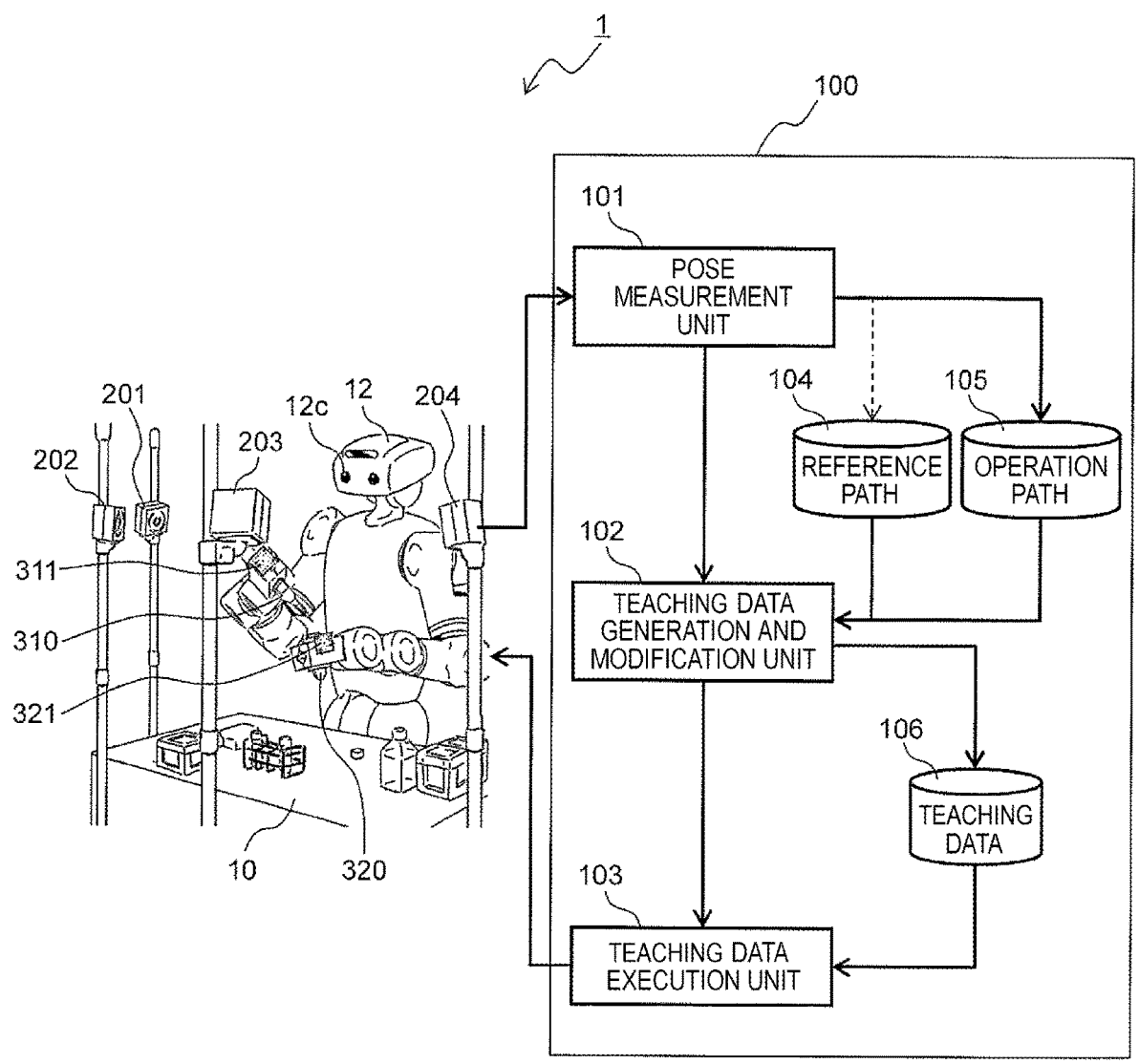

[FIG. 11]
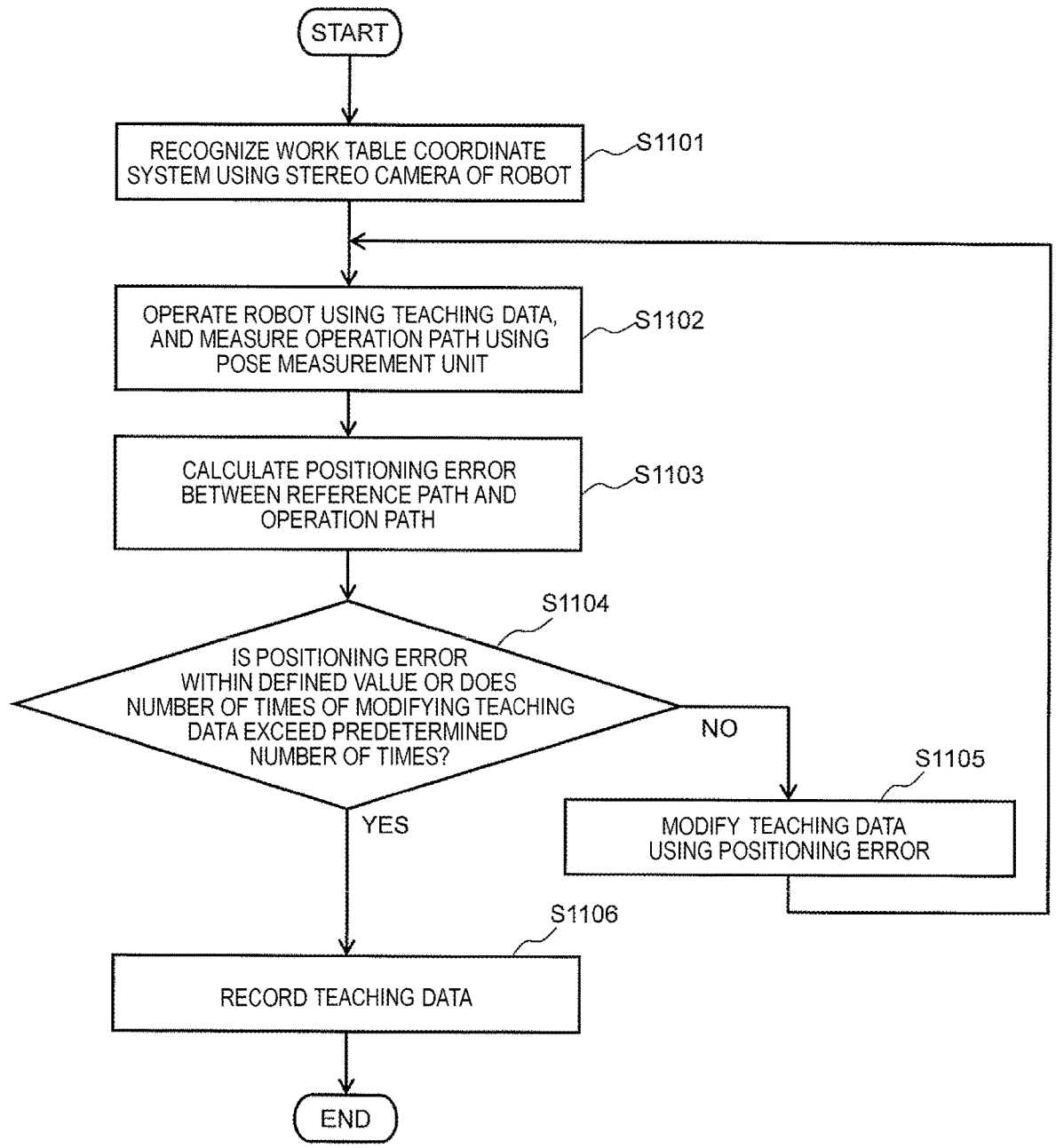

[FIG. 12]
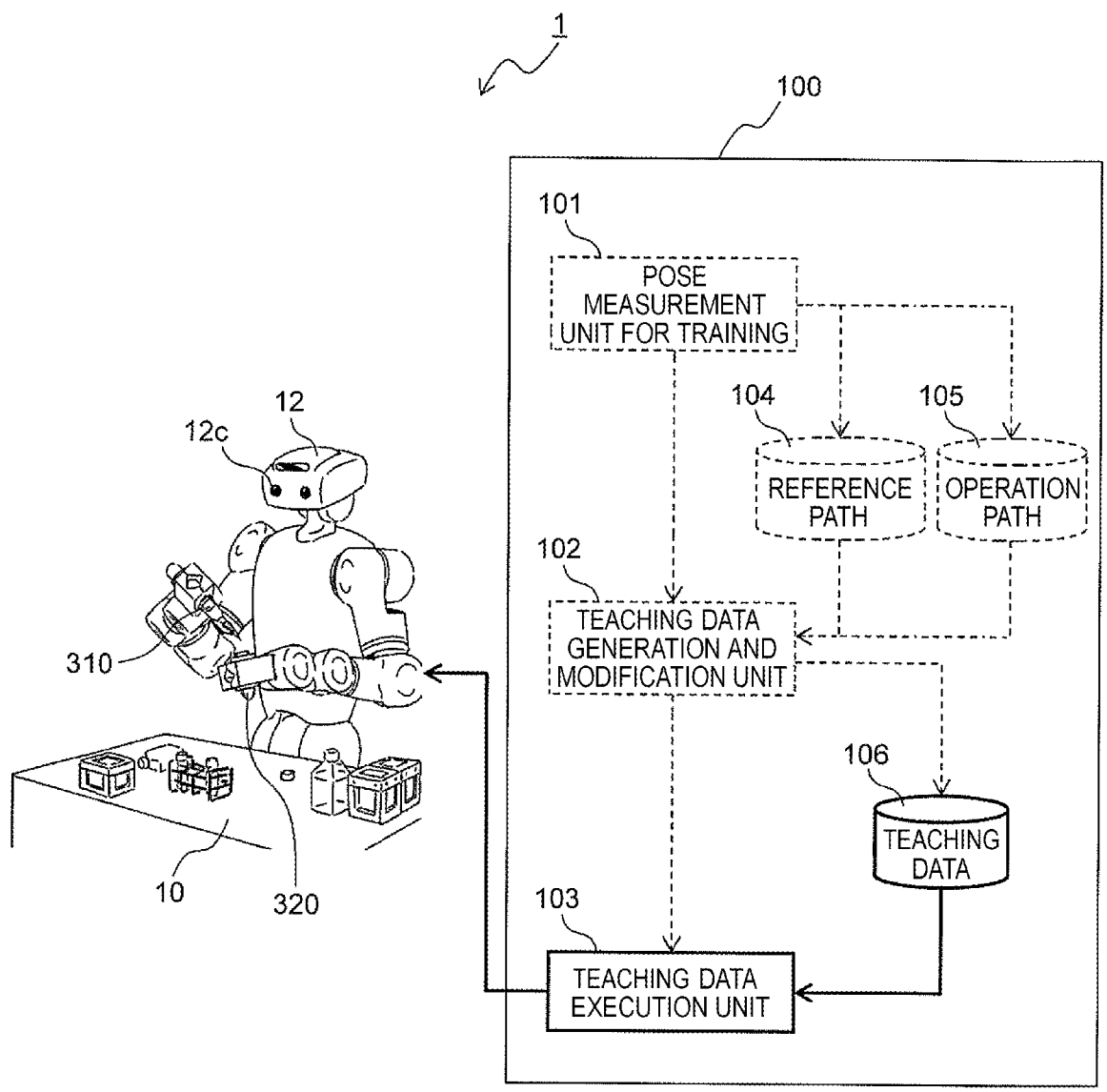

[FIG. 13]
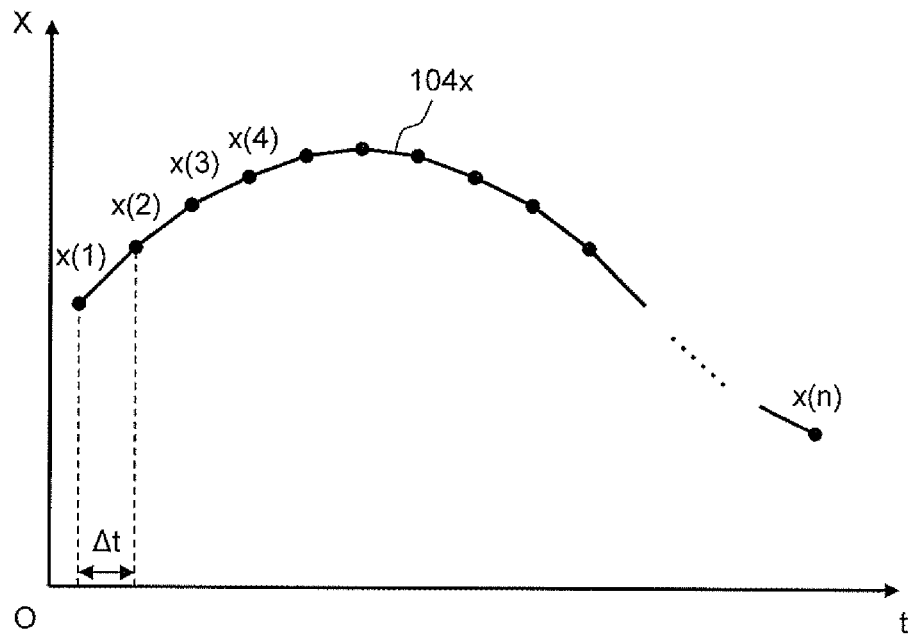
[FIG. 14]
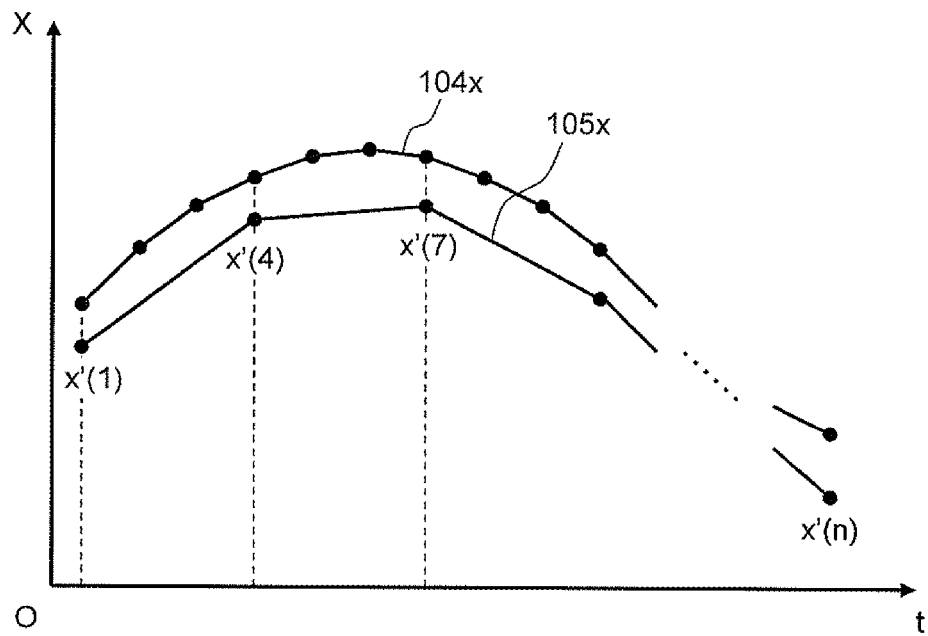

TASK TEACHING METHOD AND TASK TEACHING SYSTEM

TECHNICAL FIELD

The present invention relates to a task teaching method, a task teaching apparatus, and a task teaching system for teaching a task to a robot.

BACKGROUND ART

PTL 1 discloses a task teaching method for teaching a task to a robot.

CITATION LIST

Patent Literature

PTL 1: JP2017-217738A

SUMMARY OF INVENTION

Technical Problem

In general, a robot has high accuracy for a repeated task that is reproduced at the same position. On the other hand, there are many cases where the positioning accuracy of an absolute position in a real space (hereinafter, referred to as absolute positioning accuracy) is not ensured. Therefore, when a task is taught to a robot, the absolute positioning accuracy causes a problem. There is an error between coordinates given to the robot as a command value and a position determined in a real space. Therefore, to teach the robot to accurately execute the task, it is necessary to take a countermeasure against the effect of the error. However, the error changes depending on various causes such as a structure of the robot, a path of the command value given to the robot, and the weight of an object gripped by the robot.

In the task teaching method disclosed in PTL 1, a task operation of a worker is three-dimensionally measured using an ultrasonic range finder, and a correction control of a task operation of a multi-axis robot is executed using the three-dimensional measurement data. In PTL 1, while an actual task is being executed by the multi-axis robot, the task operation of the multi-axis robot is measured using the ultrasonic range finder, and the correction control of the task operation of the multi-axis robot is executed using the three-dimensional measurement data relating to the task operation of the worker that is acquired in advance.

In PTL 1, the correction control is executed while the actual task is being executed by the multi-axis robot, and thus the ultrasonic range finder is always necessary. When the task operation is a high-speed operation, the correction control is not in time during the operation. Therefore, there is a problem in that it is difficult to apply PTL 1 to a high-speed task.

An object of the present invention is to provide a task teaching method and a task teaching apparatus for a robot in which a robot can execute an actual task with a simple configuration and a task operation of a teacher can also be taught with high accuracy to a robot that executes a high-speed task.

Solution to Problem

To achieve the object, according to the present invention, there is provided a task teaching method executed by a task teaching apparatus for teaching a task to a robot that includes a gripper unit configured to grip a grip target object and moves the grip target object gripped by the gripper unit, the task teaching method including: a generation step of outputting, as a reference path, time-series data regarding a position and an attitude of the grip target object when a teacher grips and moves the grip target object and generating teaching data of the robot corresponding to the reference path; and a modification step of outputting, as an operation path, time-series data regarding a position and an attitude of the grip target object or the gripper unit when the robot is operated using the teaching data before an actual task is executed by the robot and modifying the teaching data such that the operation path matches with the reference path.

Advantageous Effects of Invention

According to the present invention, it is possible to provide a task teaching method and a task teaching apparatus for a robot in which a robot can execute an actual task with a simple configuration and a task operation of a teacher can also be taught with high accuracy to a robot that executes a high-speed task.

Objects, configurations, and effects other than those described above will be clarified by describing the following embodiments.

BRIEF DESCRIPTION OF DRAWINGS

FIG. 1 is a configuration diagram illustrating a task teaching apparatus according to a first embodiment.

FIG. 2 is a block diagram illustrating a hardware configuration of a control device.

FIG. 3 is a diagram illustrating the arrangement of cameras for a work table.

FIG. 4 is a diagram

FIG. 5 is a diagram

FIG. 6 is a diagram

FIG. 7 is a flowchart illustrating an operation of the control device.

FIG. 8 is a configuration diagram illustrating a task teaching apparatus in a generation step.

FIG. 9 is a flowchart illustrating the details of the generation step.

FIG. 10 is a configuration diagram illustrating the task teaching apparatus in a modification step.

FIG. 11 is a flowchart illustrating the details of the modification step.

FIG. 12 is a configuration diagram illustrating the task teaching apparatus when the robot executes an actual task.

FIG. 13 is a schematic diagram illustrating a reference path that is measured in the generation step.

FIG. 14 is a schematic diagram illustrating an operation path that is measured in the modification step.

FIG. 15 is a diagram

FIG. 16 is a diagram

DESCRIPTION OF EMBODIMENTS

Figure 4A:
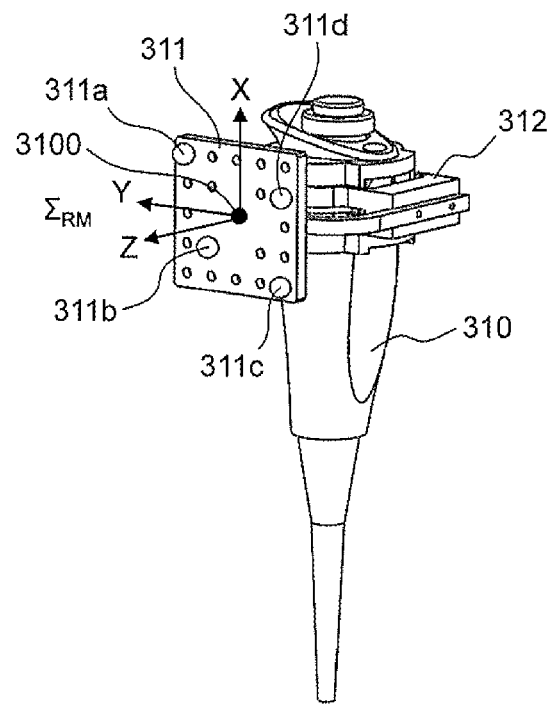
FIGS. 4A and 4B are diagrams illustrating a state where a marker plate is attached to a grip target object.

Hereinafter, an embodiment of a task teaching method, a task teaching apparatus, and a robot including the task teaching apparatus according to the present invention will be described using the drawings.

First Embodiment

In the first embodiment, an example of a task teaching method and a task teaching apparatus in which a task executed by a teacher can be taught to a robot with high accuracy will be described using FIGS. 1 to 14.
(Task Teaching Apparatus 1)
FIG. 1 is a configuration diagram illustrating the task teaching apparatus according to the first embodiment. In the first embodiment, as an example of a task to be taught by a teacher 11, a task of dispensing a reagent into a test tube 320 gripped by a left hand using a micropipette 310 gripped by a right hand on a work table 10 is taught to a robot 12. The task teaching apparatus 1 includes cameras 201 to 204 for a motion capture system provided in the work table 10, a marker plate 311 attached to the micropipette 310, a marker plate 321 attached to the test tube 320, and a control device 100. The cameras 201 to 204 are an example of the capturing means according to the present invention. The robot 12 grips a grip target object (in the first embodiment, the micropipette 310 and the test tube 320) and moves the gripped grip target object. The robot 12 has two hands that grip and move the micropipette 310 and the test tube 320, can move the grip target object to any position in a movable range, and can grip the grip target object with any attitude. The operation of the robot 12 is controlled by the control device 100. In the first embodiment, the control device 100 that is separately provided from the robot 12 teaches a task to the robot 12. However, the control device 100 may be incorporated into the robot 12. The control device 100 may be an on-premises device or a cloud-based device.
(Robot 12)
The robot 12 includes a stereo camera 12c provided in a portion corresponding to eyes of a head. The robot 12 includes one or a plurality of joint axes in a neck thereof, and can direct the stereo camera 12c toward any direction of the work table 10. The robot 12 is provided in an unmanned carrier (not illustrated), moves in a room, and autonomously moves to the front of the work table 10 using a map of the room that is created in advance.
(Software Configuration of Control Device 100)
The control device 100 includes a pose measurement unit 101, a teaching data generation and modification unit 102, and a teaching data execution unit 103. The pose measurement unit 101 outputs time-series data regarding a three-dimensional position and an attitude of each of the marker plates 311 and 321 from a plurality of images acquired by the cameras 201 to 204. The pose measurement unit 101 is an example of the output means according to the present invention. Hereinafter, the three-dimensional position and the attitude of each of the marker plates 311 and 321 will be referred to as a pose. The time-series data regarding the pose output from the pose measurement unit 101 is recorded as a reference path 104 or an operation path 105.

The teaching data generation and modification unit 102 calculates data from the reference path 104 as a command value for the robot 12, and the data is recorded as teaching data 106. The teaching data generation and modification unit 102 modifies the recorded teaching data 106 and records the modified teaching data 106. The teaching data generation and modification unit 102 is an example of the generation means according to the present invention.

The teaching data execution unit 103 operates the robot 12 using the teaching data 106 and the modified teaching data 106. The details of the reference path 104, the operation path 105, and the teaching data 106 will be described below.

In the first embodiment, the example of teaching a task to the robot 12 having the two hands is described. However, one or a plurality of robots having one hand may be used. When a plurality of robots having one hand are used, the robots may have different kinds of hands.
(Hardware Configuration of Control Device 100)
FIG. 2 is a block diagram illustrating a hardware configuration of the control device. As illustrated in FIG. 2, the control device 100 includes a processor 120, a communication interface (hereinafter, the interface will be abbreviated as I/F) 121, a main storage device 122, an auxiliary storage device 123, an input/output I/F 124, and a bus 125 via which the respective units described above are communicably connected to each other.

The processor 120 is a central processing unit that controls the operations of the respective units of the control device 100. The processor 120 is, for example, a central processing unit (CPU), a digital signal processor (DSP), or an application specific integrated circuit (ASIC). The processor 120 loads a program stored in the auxiliary storage device 123 to a work area of the main storage device 122 such that the program is executable in the work area. The main storage device 122 stores a program to be executed by the processor 120, data to be processed by the processor 120, and the like. By executing the program loaded in the main storage device 122, the processor 120 functions as the pose measurement unit 101, the teaching data generation and modification unit 102, and the teaching data execution unit 103 described above. The main storage device 122 is, for example, a flash memory, a random access memory (RAM), or a read only memory (ROM). The auxiliary storage device 123 stores various programs and various types of data. The auxiliary storage device 123 stores, for example, an operating system (OS), various programs, and various tables. The auxiliary storage device 123 is, for example, a silicon disk including a non-volatile semiconductor memory (a flash memory or an erasable programmable ROM (EPROM)), a solid state drive device, or a hard disk drive (HDD) device. An input device such as a keyboard or a mouse and an output device such as a display that are not illustrated in the drawing are connected to the input/output I/F 124. The communication I/F 121 is communicably connected to the cameras 201 to 204 or the robot 12. Images acquired by the cameras 201 to 204 are input to the processor 120 via the communication I/F 121. The images input to the processor 120 are processed by the processor 120 and are recorded in the auxiliary storage device 123 as the reference path 104 or the operation path 105. The processor 120 processes the reference path 104 recorded in the auxiliary storage device 123, generates the teaching data 106, and records the teaching data 106 in the auxiliary storage device 123. The processor 120 modifies the teaching data 106 and records the modified teaching data 106 in the auxiliary storage device 123. The communication I/F 121 outputs the teaching data 106 or the modified teaching data 106 to the robot 12 according to an instruction from the processor 120.

FIG. 3 is a diagram illustrating the arrangement of the cameras 201 to 204 for the work table 10. The marker plates 311 and 321 are attached to the micropipette 310 and the test tube 320 gripped by the teacher 11 who stands in front of the work table 10 and executes a task. To output the time-series data regarding the pose of the marker plates 311 and 321, the cameras 201 to 204 are provided opposite to the teacher 11 with the work table 10 therebetween. The cameras 201 to 204 are provided at intervals such that fields of view 210 thereof cover the work table 10 while overlapping each other. The motion capture system executes calibration, understands a relative positional relationship between the cameras 201 to 204 provided in the work table 10, and sets a work table coordinate system 2100 ($\Sigma_W$) as a coordinate system during measurement by the motion capture system. During the calibration, the cameras 201 to 204 captures reflective markers having a known arrangement multiple times. The reference path 104, the operation path 105, and the teaching data 106 are based on the work table coordinate system 2100 ($\Sigma_W$). The work table coordinate system 2100 is a task environment coordinate system representing a task environment where the robot 12 executes a task. Three markers 12m are provided on the work table 10. The arrangement of the markers 12m is registered in the control device 100 in advance, and when the robot 12 operates in front of the work table 10, the markers 12m are captured by the stereo camera 12c to obtain a positional relationship between the robot 12 and the work table coordinate system 2100 ($\Sigma_W$).

Figure 4B:
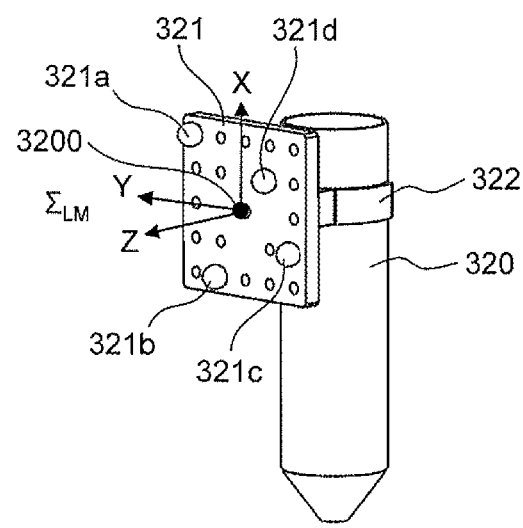

FIG. 4 is a diagram illustrating a state where the marker plate is attached to the grip target object. Four reflective markers 311a to 311d and four reflective markers 321a to 321d are arranged in the marker plates 311 and 321, respectively. The reflective markers 311a to 311d and the reflective markers 321a to 321d are arranged to be top-bottom and left-right asymmetrical on the marker plates 311 and 321. In the marker plates 311 and 321, marker plate coordinate systems 3100 ($\Sigma_{RM}$) and 3200 ($\Sigma_{LM}$) are set, respectively. In the pose measurement unit 101, arrangement patterns of the reflective markers 311a to 311d and the reflective markers 321a to 321d and a positional relationship between the marker plate coordinate systems 3100 ($\Sigma_{RM}$) and 3200 ($\Sigma_{LM}$) are registered in advance. The pose measurement unit 101 measures poses of the marker plate coordinate systems 3100 ($\Sigma_{RM}$) and 3200 ($\Sigma_{LM}$) based on the work table coordinate system 2100 ($\Sigma_W$). By arranging the reflective markers 311a to 311d and the reflective markers 321a to 321d in different arrangement patterns, the pose measurement unit 101 can simultaneously measure the poses of the marker plates 311 and 321 while distinguishing between the marker plates 311 and 321. The marker plates 311 and 321 can also be distinguished from each other by making the size or the color of the reflective markers 311a to 311d different from that of the reflective markers 321a to 321d instead of adopting the different arrangement patterns. The numbers of the reflective markers arranged in the marker plate 311 and the marker plate 321 may be different as long as the numbers are three or more. The reflective markers are two-dimensionally arranged in FIG. 3 but may be three-dimensionally arranged. The marker plate 311 is attached to the micropipette 310 through an attachment 312. The marker plate 321 is attached to the test tube 320 through an attachment 322. The attachments 312 and 322 have shapes that do not interrupt the teacher 11 from gripping and moving the micropipette 310 and the test tube 320. As a result, the motion capture system can easily measure the poses of the marker plates 311 and 321 when the teacher 11 grips and moves the micropipette 310 and the test tube 320.

(Details of Hand)

Next, the details of the hand of the robot 12 that grips the grip target object will be described. The hand of the robot 12 is an example of the gripper unit according to the present invention. Here, the details of the left hand of the robot 12 that grips the test tube 320 will be described using FIGS. 5 and 6.

Figure 5A:
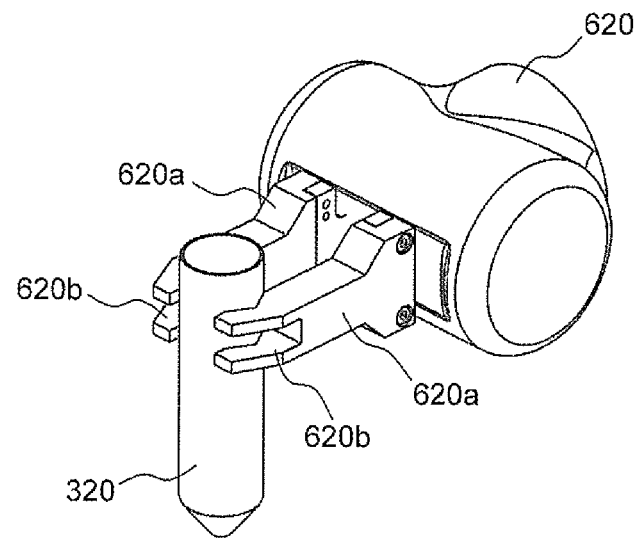
FIGS. 5A to 5C are diagrams illustrating a coordinate system set for a hand of a robot that grips a test tube.
Figure 5B:
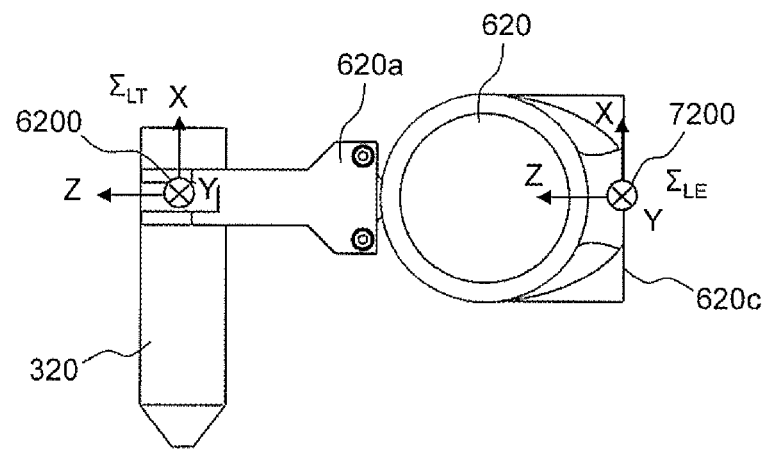
Figure 5C:
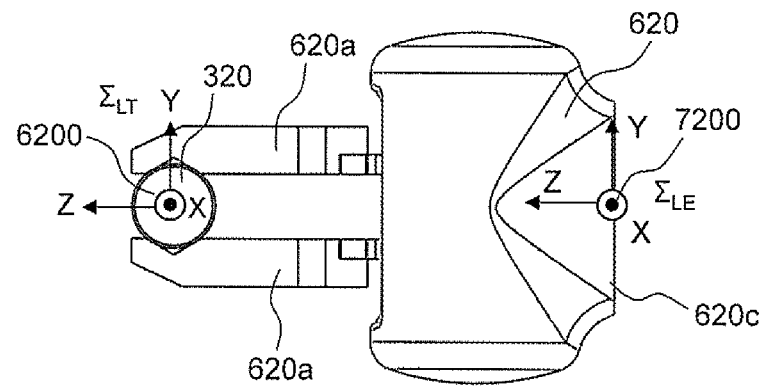
Figure 6A:
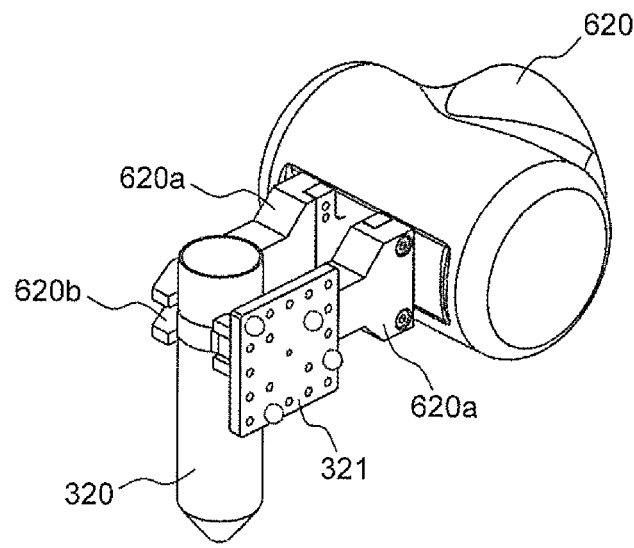
FIGS. 6A to 6C are diagrams illustrating a relationship between the coordinate system set for the hand of the robot that grips the test tube and a coordinate system set for the marker plate.
Figure 6B:
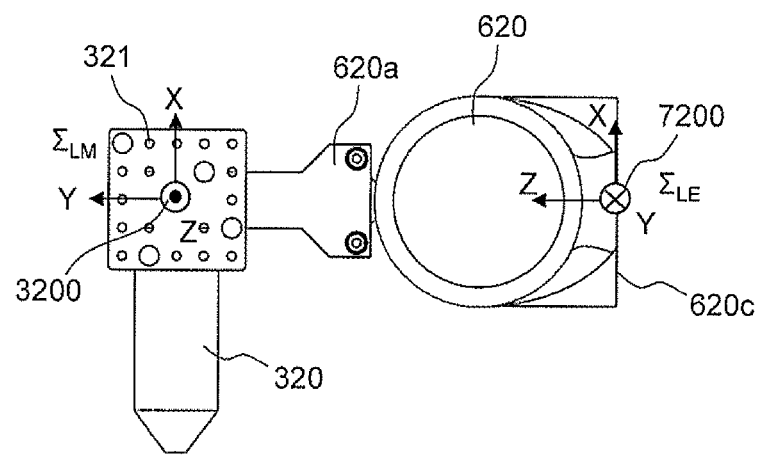
Figure 6C:
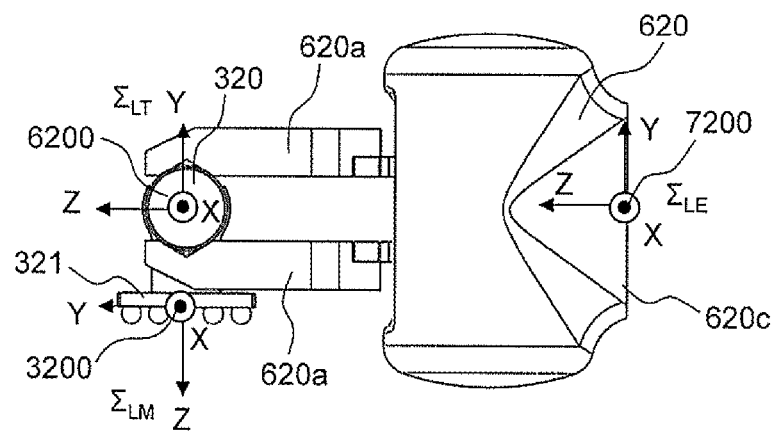

FIG. 5 is a diagram illustrating a coordinate system set for a left hand 620 of the robot 12 that grips the test tube 320. FIG. 6 is a diagram illustrating a relationship between the coordinate system set for the left hand 620 and a coordinate system set for the marker plate 321. The left hand 620 includes two fingers 620a that open and close, and grips the test tube 320 such that the test tube 320 is interposed between recess parts of tips of the fingers 620a. In the tip of the finger 620a, a notch portion 620b is provided, and the test tube 320 to which the marker plate 321 is attached can be gripped. A left gripper unit coordinate system 6200 ($\Sigma_{LT}$) is set for the grip center of the finger 620a of the left hand 620, and a left link tip coordinate system 7200 ($\Sigma_{LE}$) is set for the center of a left wrist flange 620c of the robot 12 to which the left hand 620 is attached. A positional relationship of the left gripper unit coordinate system 6200 ($\Sigma_{LT}$) relative to the left link tip coordinate system 7200 ($\Sigma_{LE}$) is registered in the control device 100 in advance as a link parameter of the robot 12, and the command value for the robot 12 is given as a pose of the left gripper unit coordinate system 6200 ($\Sigma_{LT}$). A positional relationship between the marker plate coordinate system 3200 ($\Sigma_{LM}$) and the left gripper unit coordinate system 6200 ($\Sigma_{LT}$) illustrated in FIG. 6 is also registered in the control device 100 in advance. By measuring the marker plate 321 using the motion capture system to measure the pose of the marker plate coordinate system 3200 ($\Sigma_{LM}$), the pose of the left gripper unit coordinate system 6200 ($\Sigma_{LT}$) corresponding to the pose of the marker plate coordinate system 3200 ($\Sigma_{LM}$) can be calculated. In the first embodiment, the pose of the left gripper unit coordinate system 6200 ($\Sigma_{LT}$) is used as the teaching data 106. Here, the left hand 620 that grips the test tube 320 is described as an example. However, the same can also be applied to the right hand that grips the micropipette 310.

(Operation of Control Device 100)

FIG. 7 is a flowchart illustrating an operation of the control device. As illustrated in FIG. 7, the control device 100 according to the first embodiment executes a teaching stage of teaching a task to the robot 12 and an execution stage of getting the robot 12 to execute an actual task. The teaching stage of teaching a task to the robot 12 includes two steps of a generation step (refer to FIG. 9) of getting the teacher 11 to demonstrate the task to generate the teaching data 106, and a modification step (refer to FIG. 11) of modifying the teaching data 106. In the generation step, time-series data regarding a position and an attitude of the grip target object when the teacher 11 grips and moves the grip target object is output as the reference path 104, and teaching data of the robot 12 corresponding to the reference path 104 is generated. In the modification step, time-series data regarding a position and an attitude of the grip target object when the robot 12 is operated using the teaching data 106 is output as the operation path 105 before an actual task is executed by the robot 12. In the modification step, the teaching data 106 is modified such that the operation path 105 matches with the reference path 104. Next, in the execution stage, the control device 100 gets the robot 12 to execute the actual task using the teaching data 106 or the teaching data 106 modified in the modification step.

(Generation Step)

First, the generation step of generating the teaching data 106 will be described using FIGS. 8 and 9. FIG. 8 is a configuration diagram illustrating the task teaching apparatus 1 in the generation step. FIG. 9 is a flowchart illustrating the details of the generation step. In the generation step, first, the teacher 11 stands in front of the work table 10. The teacher 11 demonstrates a task of gripping and moving the micropipette 310 and the test tube 320 to which the marker plates 311 and 321 are attached. The pose measurement unit 101 measures the poses of the marker plates 311 and 321 at a predetermined sampling period (for example, 10 Hz), and outputs and records time-series data regarding the poses of the marker plate coordinate systems 3100 and 3200 ($\Sigma_{RM}$, $\Sigma_{LM}$) as the reference path 104 (S901). The time-series data regarding the poses of the marker plates 311 and 321 is an example of the reference path (the time-series data regarding the position and the attitude of the grip target object) according to the present invention. Next, the teaching data generation and modification unit 102 generates the teaching data 106 of the robot 12 corresponding to the reference path 104. Specifically, the teaching data generation and modification unit 102 generates time-series data regarding the poses of the gripper unit coordinate systems 6200 ($\Sigma_{LT}$, $\Sigma_{RT}$) of the two hands of the robot 12 from the recorded reference path 104, and sets the generated time-series data as the teaching data 106 (S902). The teaching data generation and modification unit 102 checks whether the generated teaching data 106 is executable (S903). Specifically, the teaching data generation and modification unit 102 executes inverse kinematics calculation on the teaching data 106 assuming that the robot 12 is provided at a predetermined position in front of the work table 10. The teaching data generation and modification unit 102 checks whether a solution of a joint angle of the robot 12 is obtained, whether the obtained solution of the joint angle is discontinuous, and whether there is interference with the robot 12 itself or the surrounding environment of the robot 12 at the obtained solution of the joint angle. When the teaching data 106 is executable without any problem, the teaching data 106 is recorded as data that is executable by the robot 12 (S904). Accordingly, the generation step is completed. In S903, when it is determined that the teaching data 106 is inexecutable, the determination is presented to the teacher 11, and the measurement of the reference path 104 (S901) is executed again.

(Modification Step)

Next, the modification step of modifying the teaching data 106 will be described using FIGS. 10 and 11. The detail of necessary calculation is described below, and the flows of the procedure will be described here. FIG. 10 is a configuration diagram illustrating the task teaching apparatus 1 in the modification step. FIG. 11 is a flowchart illustrating the details of the modification step. In the modification step, the teacher 11 moves away from the work table 10, and the robot 12 is moved to a position in front of the work table 10 by an unmanned carrier instead. The robot 12 grips the micropipette 310 and the test tube 320 to which the marker plates 311 and 321 are attached. The robot 12 measures the markers 12*m* on the work table 10 using the stereo camera 12*c*, and recognizes the work table coordinate system 2100 ($\Sigma_W$) (S1101). As a result, an error of the standing position of the robot 12 relative to the work table 10 is obtained. Next, the teaching data execution unit 103 operates the robot 12 using the teaching data 106 recorded in the generation step, and grips and moves the micropipette 310 and the test tube 320 to which the marker plates 311 and 321 are attached. Here, the pose measurement unit 101 measures and records the time-series data regarding the poses of the marker plates 311 and 321 as the operation path 105 (S1102). The time-series data regarding the poses of the marker plates 311 and 321 is an example of the operation path (the time-series data regarding the position and the attitude of the grip target object) according to the present invention. The time-series data regarding the poses of the marker plates 311 and 321 is the time-series data regarding the position and the attitude of the grip target object according to the present invention.

During the measurement of the operation path 105 in S1102, instead of executing the teaching data 106 as it is, the operation of the robot 12 is stopped at intervals of several points to measure time-series data regarding the poses of the marker plates 311 and 321 during the stop as the operation path 105. Next, the teaching data generation and modification unit 102 calculates an error (hereinafter, referred to as positioning error) between the reference path 104 and the operation path 105 (S1103). When the positioning error exceeds a predetermined defined value (S1104: Yes), the teaching data generation and modification unit 102 modifies the teaching data 106 using the positioning error (S1105). The modified teaching data 106 is recorded in the auxiliary storage device 123. The teaching data execution unit 103 operates the robot 12 using the modified teaching data 106, and executes the measurement of the operation path 105 (S1102) and the calculation of the positioning error (S1103) again. When the positioning error that is calculated again exceeds the predetermined defined value or until the number of times the teaching data 106 is modified exceeds a predetermined number of times, steps S1102 to S1105 are repeated. When the positioning error is within the predetermined defined value or when the number of times the teaching data 106 is modified exceeds a predetermined number of times, the teaching data 106 or the modified teaching data 106 is recorded (S1106). As a result, the modification step is completed.

(Execution Step)

Next, the actual task that is executed by the robot 12 using the teaching data 106 or the modified teaching data 106 will be described using FIG. 12. FIG. 12 is a configuration diagram illustrating the task teaching apparatus 1 that gets the robot 12 to execute the actual task after completion of the teaching stage. After the completion of the teaching stage, the marker plates 311 and 321 are removed from the micropipette 310 and the test tube 320. The cameras 201 to 204 are removed from the work table 10. The robot 12 moves to a position in front of the work table 10. The robot 12 measures the markers 12*m* on the work table 10 using the stereo camera 12*c*, and recognizes the work table coordinate system 2100 ($\Sigma_W$). As a result, an error of the standing position of the robot 12 relative to the work table 10 is obtained. Next, the teaching data execution unit 103 gets the robot 12 to execute the actual task using the teaching data 106 or the modified teaching data 106. The robot 12 operates according to the teaching data 106 or the modified teaching data 106, and grips and moves the micropipette 310 and the test tube 320.

(Method of Calculating Teaching Data 106 and Modified Teaching Data 106)

The details of a method of calculating the teaching data 106 and the modified teaching data 106 will be described using FIGS. 13 and 14. All of the reference path 104, the operation path 105, and the teaching data 106 include data of the two hands of the robot 12. However, for simplicity of the description, the left hand will be described as an example.

First, a method of acquiring the teaching data 106 from the reference path 104 will be described. FIG. 13 is a schematic diagram illustrating the reference path 104 measured in the generation step. The reference path 104 measured in S901 is time-series data regarding the pose of the marker plate 321 measured at a predetermined sampling period by the motion capture system, and is expressed by the following expression.

$$^{W}T_{LM}(i) = \begin{bmatrix} ^{W}R_{LM}(i) & ^{W}p_{LM}(i) \\ 0 & 1 \end{bmatrix} \quad \text{[Expression 1]}$$

In Expression 1, the upper left subscript "W" represents that the work table coordinate system 2100 ($\Sigma_W$) is the base, and the lower right subscript "LM" represents that the marker plate coordinate system 3200 ($\Sigma_{LM}$) is the target. The argument "i" represents the order of the time-series data. The meanings of the subscripts in the expression are the same in the following expressions. $^{W}T_{LM}$ (i) is a 4×4 homogeneous transformation matrix, $^{W}R_{LM}$ (i) is a 3×3 rotation matrix representing the attitude, and $^{W}p_{LM}$ (i) is a 3×1 position vector representing the position. The expression of the attitude may be an expression using an Eulerian angle or a quaternion in addition to the rotation matrix. FIG. 13 is an example illustrating an attitude and a position only at an X coordinate 104x among attitudes and positions in the reference path 104, and is data where x(i) is arranged at a predetermined sampling period Δt.

In S902, the teaching data 106 is generated from the reference path 104 according to the next expression.

$$^{W}T_{LT}(i) = {^{W}T_{LM}(i)} \cdot \left(^{LT}T_{LM}\right)^{-1} \quad \text{[Expression 2]}$$

In Expression 2, $^{LT}T_{LM}$ represents the pose of the marker plate coordinate system 3200 ($\Sigma_{LM}$) when seen from the left gripper unit coordinate system 6200 ($\Sigma_{LT}$), and is known from FIG. 6. $^{W}T_{LT}$ (i) obtained from Expression 2 represents the time-series data regarding the pose of the left gripper unit coordinate system 6200 ($\Sigma_{LT}$) based on the work table coordinate system 2100 ($\Sigma_W$), and is the teaching data 106.

Next, a method of modifying the teaching data 106 from the operation path 105 in the modification step will be described. FIG. 14 is a schematic diagram illustrating the operation path 105 measured in the modification step. The operation path 105 is the time-series data regarding the pose of the marker plate 321 measured by operating the robot 12 using the teaching data 106 in S1102 and stopping the robot 12 at intervals of several points, and is expressed by the following expression by adding primes to the right side of Expression 1.

$$^{W}T'_{LM}(i) = \begin{bmatrix} ^{W}R'_{LM}(i) & ^{W}p'_{LM}(i) \\ 0 & 1 \end{bmatrix} \quad \text{[Expression 3]}$$

FIG. 14 is an example illustrating an attitude and a position only at an X coordinate 105x among attitudes and positions in the operation path 105 as in FIG. 13, and is data measured at intervals of two points, for example, at points of i=1, 4, 7, . . . .

The positioning error in S1103 is a difference between the reference path 104 and the operation path 105, and at i where the operation path 105 is measured, a position error $p_e$ (i) and an attitude error $R_e$ (i) are defined as in the following expression.

$$p_e(i) = {^{W}p'_{LM}(i)} - {^{W}p_{LM}(i)} \quad \text{[Expression 4]}$$

$$R_e(i) = \left(^{W}R_{LM}(i)\right)^{-1} \cdot {^{W}R'_{LM}(i)} \quad \text{[Expression 5]}$$

As can be seen from Expressions 4 and 5, the position error $p_e$ (i) is a difference in simple position vector, and the attitude error $R_e$ (i) is a rotation matrix of the attitude of the operation path 105 when seen from the attitude of the reference path 104. At i where the operation path 105 is not measured, the positioning error obtained from Expressions 4 and 5 is interpolated to acquire the positioning error. The interpolation method may be any interpolation method such as spline interpolation in addition to linear interpolation. Note that, since the attitude error $R_e$ (i) is a 3×3 rotation matrix, there is a case where the constraints on the rotation matrix are not satisfied when the interpolation calculation is executed in the matrix form as it is. Accordingly, by converting the form into another expression form such as an Eulerian angle or a quaternion, executing the interpolation calculation, and converting the form into the rotation matrix again, the position error $p_e$ (i) and the attitude error $R_e$ (i) can be obtained for all of i of the reference path 104.

When the positioning error exceeds the defined value, the teaching data 106 is modified using the positioning error. The teaching data 106 modified such that the operation path 105 matches with the reference path 104 is acquired from the following expression.

$$^{W}T_{LT}(i) = \begin{bmatrix} ^{W}R_{LM}(i) \cdot (R_e(i))^{-1} & ^{W}p_{LM}(i) - p_e(i) \\ 0 & 1 \end{bmatrix} \cdot \left(^{LT}T_{LM}\right)^{-1} \quad \text{[Expression 6]}$$

$^{W}T_{LT}$ (i) obtained from Expression 6 is the teaching data 106 modified from the positioning error. The operation path 105 measured again by operating the robot using the modified teaching data 106 is expressed by the following expression by adding primes to the right side of Expression 3.

$$^{W}T''_{LM}(i) = \begin{bmatrix} ^{W}R''_{LM}(i) & ^{W}p''_{LM}(i) \\ 0 & 1 \end{bmatrix} \quad \text{[Expression 7]}$$

The positioning error acquired again in S1103 is a difference between the reference path 104 and the operation path 105 and is expressed by the following expressions.

$$p'_e(i) = {^{W}p''_{LM}(i)} - {^{W}p_{LM}(i)} \quad \text{[Expression 8]}$$

$$R'_e(i) = \left(^{W}R_{LM}(i)\right)^{-1} \cdot {^{W}R''_{LM}(i)} \quad \text{[Expression 9]}$$

When the positioning error exceeds the defined value again in S1104, the modified teaching data 106 is modified in S1105. Here, the calculation of the teaching data 106 is expressed by the following expression using both of the first positioning error of Expressions 4 and 5 and the second positioning error of Expressions 8 and 9.

$$^WT_{LT}(i) = \quad\quad\quad\quad\quad\quad\quad\quad\quad\quad\quad \text{[Expression 10]}$$
$$\begin{bmatrix} ^WR_{LM}(i)\cdot(R'_e(i)\cdot R_e(i))^{-1} & ^Wp_{LM}(i)-(p_e(i)+p'_e(i)) \\ 0 & 1 \end{bmatrix} \cdot$$
$$(^{LT}T_{LM})^{-1}$$

By repeating the measurement of the operation path 105 and the modification of the teaching data 106 as described above, the modified teaching data 106 in which the operation path 105 almost matches with the reference path 104 can be obtained.

Effect of First Embodiment

In the first embodiment, the modification step S702 is executed before the robot 12 executes the actual task. As a result, during the actual task by the robot 12, it is not necessary to provide the marker plates 311 and 321 and the cameras 201 to 204 for capturing the marker plates 311 and 321. Therefore, the robot can execute the actual task with a simple configuration.

In the first embodiment, by executing the modification step S702 before the robot 12 executes the actual task, the task operation of the teacher 11 can also be taught with high accuracy to the robot 12 that executes a high-speed task.

In the first embodiment, the robot 12 recognizes the work table coordinate system 2100 ($\Sigma_W$), and operates using the teaching data based on the work table coordinate system 2100 ($\Sigma_W$). As a result, even when the accuracy of the standing position of the robot 12 relative to the work table 10 is poor, by the robot 12 recognizing the work table coordinate system 2100 ($\Sigma_W$), the error of the standing position of the robot 12 relative to the work table 10 can be obtained. As a result, the absolute positioning accuracy of the grip target object gripped by the robot 12 is ensured.

In the first embodiment, by capturing the four reflective markers 311a to 311d and the four reflective markers 321a to 321d of the marker plates 311 and 321 with the cameras 201 to 204, the three-dimensional position and the attitude of the grip target object can be easily measured.

In the first embodiment, both of the reference path 104 and the operation path 105 are the time-series data regarding the position and the attitude of the grip target object. Therefore, the position and the attitude of the grip target object gripped by the teacher 11 and the position and the attitude of the grip target object gripped by the robot 12 can be matched with high accuracy.

In the first embodiment, when the error between the reference path 104 and the operation path 105 is more than the defined value, the modification step is executed. Therefore, an unnecessary modification step can be prevented from being executed. In the modification step, the teaching data 106 can be modified using the error between the reference path 104 and the operation path 105. Therefore, the teaching data 106 can be appropriately modified according to the error.

In the first embodiment, the teaching data 106 can be obtained such that the error (positioning error) between the reference path 104 measured when the teacher 11 demonstrates the task in the generation step and the operation path 105 measured when the robot 12 is operated in the modification step is within the defined value. As a result, the robot can execute a high-accuracy task matching with the task demonstrated by the teacher 11. Examples of various causes of the positioning error include an error caused when the actual link parameter of the robot 12 does not strictly match with that in the control device 100, an error caused by deformation due to the weight of the robot 12 or the grip target object, a measurement error of the motion capture system, and an error of the attachment positions of the marker plates 311 and 321. However, in the first embodiment, the teaching data 106 is modified such that the reference path 104 and the operation path 105 match with each other when the teacher 11 and the robot 12 grip and move the grip target object in the same measurement environment. As a result, the effects of all the errors described above can be removed, and the robot 12 can be operated according to the reference path 104 taught by the teacher 11.

In the first embodiment, an example is described where the optical motion capture system is used for the measurement of the pose of the grip target object. However, other non-contact three-dimensional measurement means may be used. Examples of the non-contact three-dimensional measurement means include a magnetic three-dimensional measuring instrument, a laser tracker, and a system that analyzes an image acquired by capturing the operation of the teacher 11 with a camera. By using the non-contact three-dimensional measurement means, the teacher 11 can teach the task without being constrained by the measurement means.

In the first embodiment, an example is described in which the reference path 104 is recorded as the time-series data measured at the predetermined sampling period in S901. However, the predetermined sampling period does not need to be used, and representative points of a trajectory may be used. By recording data only at characteristic points as the time-series data, the size of data to be handled can be reduced.

When the teaching data 106 is generated in S902, it is not necessary to match durations of the time-series data of the reference path 104 and the teaching data 106 with each other. For example, the teaching data 106 may be generated after downsampling the reference path 104. As a result, the size of the data of the teaching data 106 can be reduced, and the final size of data that is required to operate the robot 12 can be reduced.

In the first embodiment, an example is described where, when the operation path 105 is measured in S1102, the robot 12 is operated using the teaching data 106 and the operation of the robot 12 is stopped at intervals of several points for the measurement by the pose measurement unit 101. However, the operation of the robot 12 may be stopped at every point for the measurement. Here, time for measuring the operation path 105 is required. However, the positioning error at each point can be obtained without interpolation. When the operation of the robot 12 is stopped at every point, the robot 12 is operated at a low speed. Therefore, whether the robot 12 operates safely can also be checked. When the robot 12 is stopped at intervals of several points, a time interval does not need to be constant. For example, the movement amounts between the respective points of the teaching data 106 is acquired in advance such that, whenever a predetermined movement amount is exceeded, the robot 12 is stopped to measure the operation path 105. As a result, the robot 12 does not need to be stopped more than necessary at portions where the movement amount is small, and a period of time required for the modification step can be reduced.

Second Embodiment

Figure 15A:
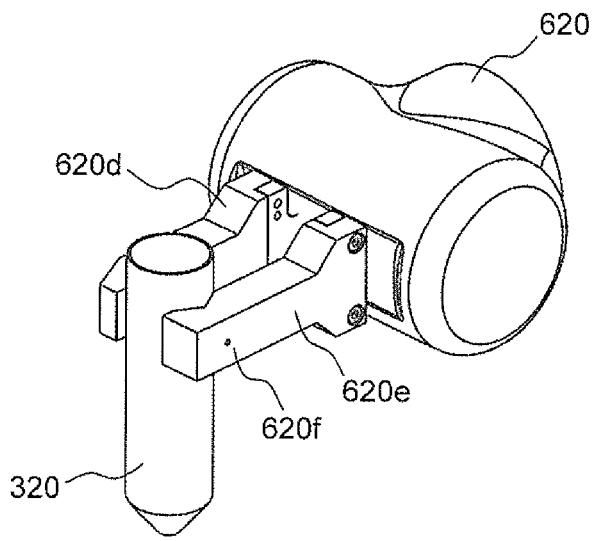
FIGS. 15A to 15C are diagrams illustrating a coordinate system set for a hand of a robot in a second embodiment.
Figure 15B:
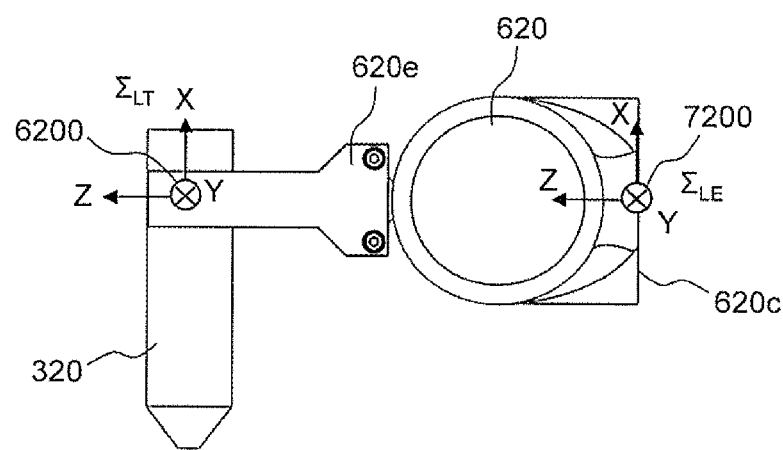
Figure 15C:
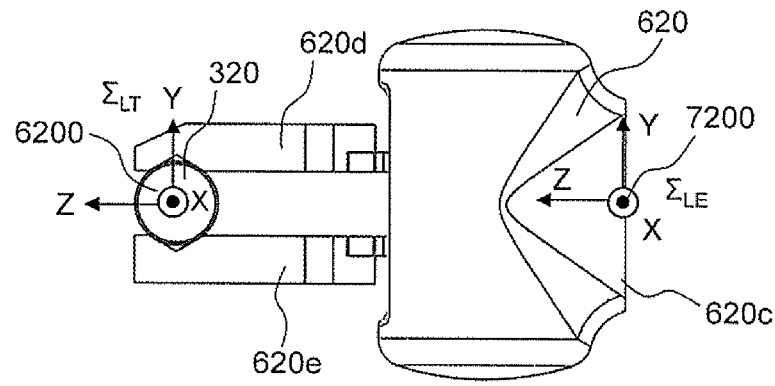
Figure 16A:
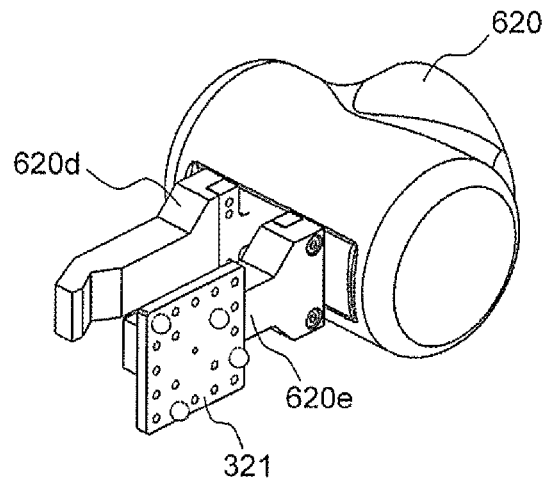
FIGS. 16A to 16C are diagrams illustrating a relationship between the coordinate system set for the hand of the robot and a coordinate system set for a marker plate in the second embodiment.
Figure 16B:
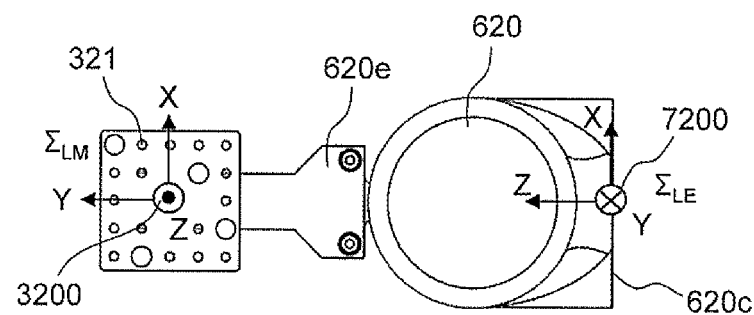
Figure 16C:
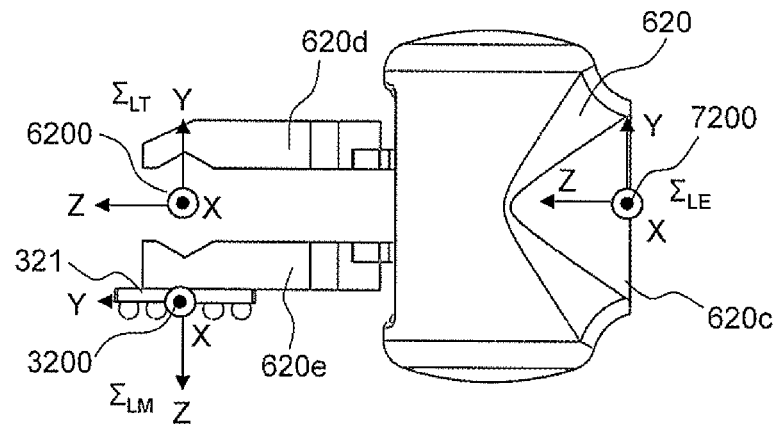

In the second embodiment, a task teaching apparatus for a robot to which a task can be taught simpler than the first embodiment will be described using FIGS. 15 and 16. FIG. 15 is a diagram illustrating a coordinate system set for the left hand 620 of the robot 12 in the second embodiment. FIG. 16 is a diagram illustrating a relationship between the coordinate system set for the left hand 620 and a coordinate system set for the marker plate 321. In FIGS. 15 and 16, the same components or members having the same functions as those of FIGS. 5 and 6 are represented by the same reference numerals, and the repeated description thereof will not be made. The left hand 620 of the robot 12 in the second embodiment includes two fingers 620d and 620e that open and close, and grips the test tube 320 such that the test tube 320 is interposed between recess parts of tips of the fingers 620d and 620e. On a side surface of the finger 620e, a marker plate mounting portion 620f where the marker plate 321 can be provided is formed.

As in the first embodiment, a task teaching procedure according to the second embodiment includes two steps of a generation step of getting the teacher 11 to demonstrate the task to generate the teaching data 106, and a modification step of getting the robot 12 to execute the task and modifying the teaching data 106. Next, the robot 12 executes the task using the teaching data 106 modified in the modification step. Hereinafter, points different from those of the first embodiment will be described in detail.

The procedure of the generation step is the same as that of the first embodiment. The time-series data regarding the poses of the marker plates 311 and 321 generated in the generation step of the second embodiment is an example of the reference path (the time-series data regarding the position and the attitude of the gripper unit) according to the present invention.

(Modification Step)

The procedure of the modification step will be described according to the flowchart of FIG. 11. In the modification step, the teacher 11 moves away from the work table 10, and the robot 12 is moved to a predetermined position in front of the work table 10 by an unmanned carrier instead. Unlike the first embodiment, the robot 12 does not grip anything, and the marker plate 321 is provided at the finger 620e of the left hand 620 as illustrated in FIG. 16. An opening width between the fingers 620d and 620e is adjusted such that a positional relationship between the marker plate coordinate system 3200 ($\Sigma_{LM}$) and the left gripper unit coordinate system 6200 ($\Sigma_{LT}$) matches with that when the left hand 620 grips the test tube 320. In the right hand, likewise, the marker plate 311 is provided, and an opening width of the fingers of the right hand is adjusted. The robot 12 measures the markers 12m on the work table 10 using the stereo camera 12c, and recognizes the work table coordinate system 2100 ($\Sigma_W$) (S1101). As a result, an error of the standing position of the robot 12 relative to the work table 10 is obtained. Next, the teaching data execution unit 103 operates the robot 12 using the teaching data 106 recorded in the generation step, and operates the two hands to which the marker plates 311 and 321 are attached. Here, the pose measurement unit 101 measures and records the time-series data regarding the poses of the marker plates 311 and 321 as the operation path 105 (S1102). The time-series data regarding the poses of the marker plates 311 and 321 is an example of the operation path (the time-series data regarding the position and the attitude of the gripper unit) according to the present invention.

During the measurement of the operation path 105 in S1102, instead of executing the teaching data 106 as it is, the operation of the robot 12 is stopped at intervals of several points to measure time-series data regarding the poses of the marker plates 311 and 321 during the stop as the operation path 105. Next, the teaching data generation and modification unit 102 calculates an error (positioning error) between the reference path 104 recorded in the generation step and the operation path 105 recorded in the modification step (S1103). When the positioning error exceeds a predetermined defined value (S1104: Yes), the teaching data generation and modification unit 102 modifies the teaching data 106 using the positioning error (S1105). The modified teaching data 106 is recorded in the auxiliary storage device 123. The teaching data execution unit 103 operates the robot 12 using the modified teaching data 106, and executes the measurement of the operation path 105 (S1102) and the calculation of the positioning error (S1103) again. When the positioning error that is calculated again exceeds the predetermined defined value or until the number of times the teaching data 106 is modified exceeds a predetermined number of times, S1102 to S1105 are repeated. When the positioning error is within the predetermined defined value or when the number of times the teaching data 106 is modified exceeds a predetermined number of times, the teaching data 106 or the modified teaching data 106 is recorded (S1106). As a result, the modification step is completed.

(Execution Step)

Next, the actual task that is executed by the robot 12 using the teaching data 106 or the modified teaching data 106 will be described. After the completion of the teaching stage, the marker plates 311 and 321 are removed from the two hands of the robot 12. The cameras 201 to 204 are removed from the work table 10. The robot 12 is arranged at a position in front of the work table 10. The robot 12 measures the markers 12m on the work table 10 using the stereo camera 12c, and recognizes the work table coordinate system 2100 ($\Sigma_W$). As a result, an error of the standing position of the robot 12 relative to the work table 10 is obtained. Next, the teaching data execution unit 103 operates the robot 12 using the teaching data 106 or the modified teaching data 106 to grip and move the micropipette 310 and the test tube 320. A state where the test tube 320 is gripped by the left hand during the actual task by the taught robot 12 is as illustrated in FIG. 15.

Effect of Second Embodiment

In the second embodiment, it is not necessary to get the robot 12 to grip the grip target object in the modification step. When the number of the kinds of grip target objects to be handled is large, the man hours of task teaching can be reduced.

In the second embodiment, the example where the marker plates 311 and 321 are removed from the two hands of the robot 12 during the actual task by the robot 12 is described. However, as long as the marker plates 311 and 321 do not interfere with the actual task, the marker plates 311 and 321 do not need to be removed. By preparing two sets including the marker plates 311 and 321 for task teaching by the teacher 11 and the marker plates 311 and 321 for attachment to the two hands of the robot 12, shift from the generation step to the modification step during the task teaching is simple. The man hours of task teaching can be reduced.

The other effects are the same as the first embodiment.

Modification Example

The present disclosure is not limited to the embodiments and includes various modification examples. For example, the embodiments have been described in detail to easily describe the present disclosure, and the present invention does not necessarily include all the configurations described above. A part of one embodiment can be replaced with a configuration of another embodiment. A configuration of one embodiment can also be added to a configuration of another embodiment. Addition, deletion, or replacement of a part of a configuration of another embodiment can also be made for a part of the configuration of each of the embodiments.

REFERENCE SIGNS LIST

1: task teaching apparatus of robot
10: work table
11: teacher
12: robot
12c: stereo camera
12m: marker
100: control device
101: pose measurement unit
102: teaching data generation and modification unit
103: teaching data execution unit
104: reference path
105: operation path
106: teaching data
201 to 204: camera
210: field of view of camera
310: micropipette
320: test tube
311, 321: marker plate
311a to 311d, 321a to 321d: reflective marker
312, 322: attachment
620: left hand
2100: work table coordinate system
3100, 3200: marker plate coordinate system
6200: left gripper unit coordinate system
7200: left link tip coordinate system

The invention claimed is:

1. A task teaching method executed by a task teaching apparatus for teaching a task to a robot that includes a gripper unit configured to grip a grip target object and moves the grip target object gripped by the gripper unit,
the task teaching method comprising:
a first step of preparing a marker of a coordinate system in a task environment;
a second step of outputting first time-series data regarding a position and an attitude of the grip target object obtained by gripping and moving the grip target object in the task environment and generating first teaching data regarding an operation of the robot corresponding to the first time-series data;
a third step of moving the robot to the task environment after the second step;
a fourth step of outputting second time-series data regarding a position and an attitude of the grip target object or the gripper unit obtained by operation of the robot using the first teaching data before an actual task is executed by the robot and after the third step; and
a fifth step of generating second teaching data regarding an operation of the robot corresponding to a difference between the first time-series data and the second time-series data, wherein
the first time-series data, the second time-series data, the first teaching data, and the second teaching data are generated based on the coordinate system, and the third step includes getting the robot to measure the marker of the coordinate system and to recognize the coordinate system.

2. The task teaching method according to claim 1, wherein the marker of the coordinate system is provided on a work table.

3. The task teaching method according to claim 1, wherein the second step includes outputting the first time-series data from a plurality of images of the grip target object obtained by gripping and moving the grip target object, the plurality of images being acquired by a plurality of capturers provided in the task environment where the robot executes the task, and
the fourth step includes outputting the second time-series data from a plurality of images of the grip target object obtained by operation of the robot, the plurality of images being acquired by the plurality of capturers.

4. The task teaching method according to claim 3, wherein the plurality of capturers captures three or more markers attached to the grip target object or three or more markers attached to the gripper unit.

5. The task teaching method according to claim 1, wherein the first time-series data and the second time-series data are time-series data regarding a position and an attitude of the grip target object.

6. The task teaching method according to claim 1, wherein in response to an error between the second time-series data and the first time-series data is more than a defined value, the generation of the second teaching data is executed.

7. The task teaching method according to claim 1, wherein in the fifth step, the second teaching data is generated using an error between the second time-series data and the first time-series data.

8. A task teaching system comprising:
a marker of a coordinate system that is provided in a task environment;
a robot that is movable to the task environment, includes a gripper unit configured to grip a grip target object, and moves the grip target object gripped by the gripper unit;
an outputter for outputting first time-series data regarding a position and an attitude of the grip target object obtained when a teacher grips and moves the grip target object in the task environment; and
a generator for generating first teaching data regarding an operation of the robot corresponding to the first time-series data, wherein;
when the robot is moved to the task environment, the outputter outputs second time-series data regarding a position and an attitude of the grip target object or the gripper unit obtained when the robot is operated using the first teaching data before an actual task is executed by the robot;
the generator generates second teaching data regarding an operation of the robot corresponding to a difference between the first time-series data and the second time-series data before the actual task is executed by the robot;
the first time-series data, the second time-series data, the first teaching data, and the second teaching data are based on the coordinate system; and
the robot measures the marker of the coordinate system and recognizes the coordinate system.

9. The task teaching system according to claim 8, wherein the marker of the coordinate system is provided on a work table.

10. The task teaching system according to claim 8, further comprising a plurality of capturers provided in a task environment where the robot executes the task, wherein
- the outputter outputs the first time-series data and the second time-series data from a plurality of images of the grip target object acquired by the capturers.

11. The task teaching system according to claim 10, wherein
- the plurality of capturers captures three or more markers attached to the grip target object or three or more markers attached to the gripper unit.

12. The task teaching system according to claim 8, wherein
- the first time-series data and the second time-series data are time-series data regarding a position and an attitude of the grip target object.

13. The task teaching system according to claim 8, wherein
- when an error between the second time-series data and the first time-series data is more than a defined value, the generator generates the second teaching data.

14. The task teaching system according to claim 8, wherein
- the generator generates the second teaching data using an error between the second time-series data and the first time-series data.

* * * * *